Dec. 13, 1927.  1,652,636
R. PAUL
DISPLAY DEVICE
Original Filed March 29, 1923    4 Sheets-Sheet 1
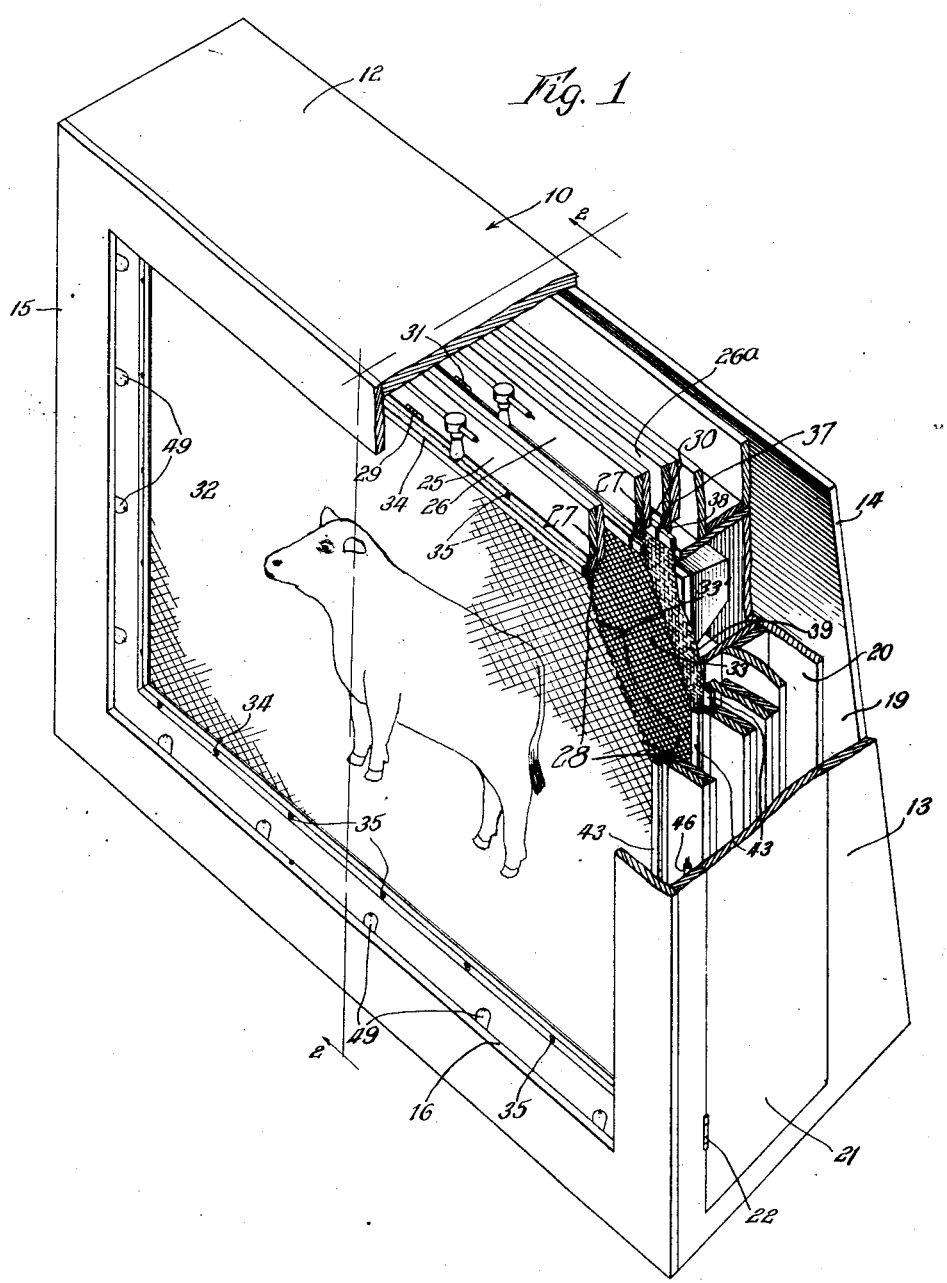

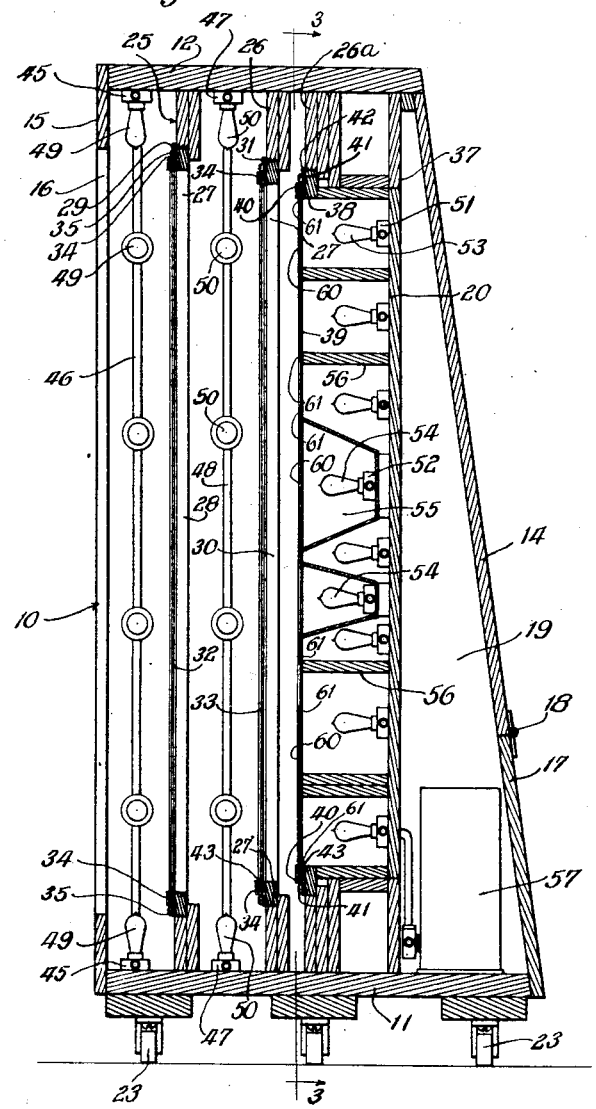

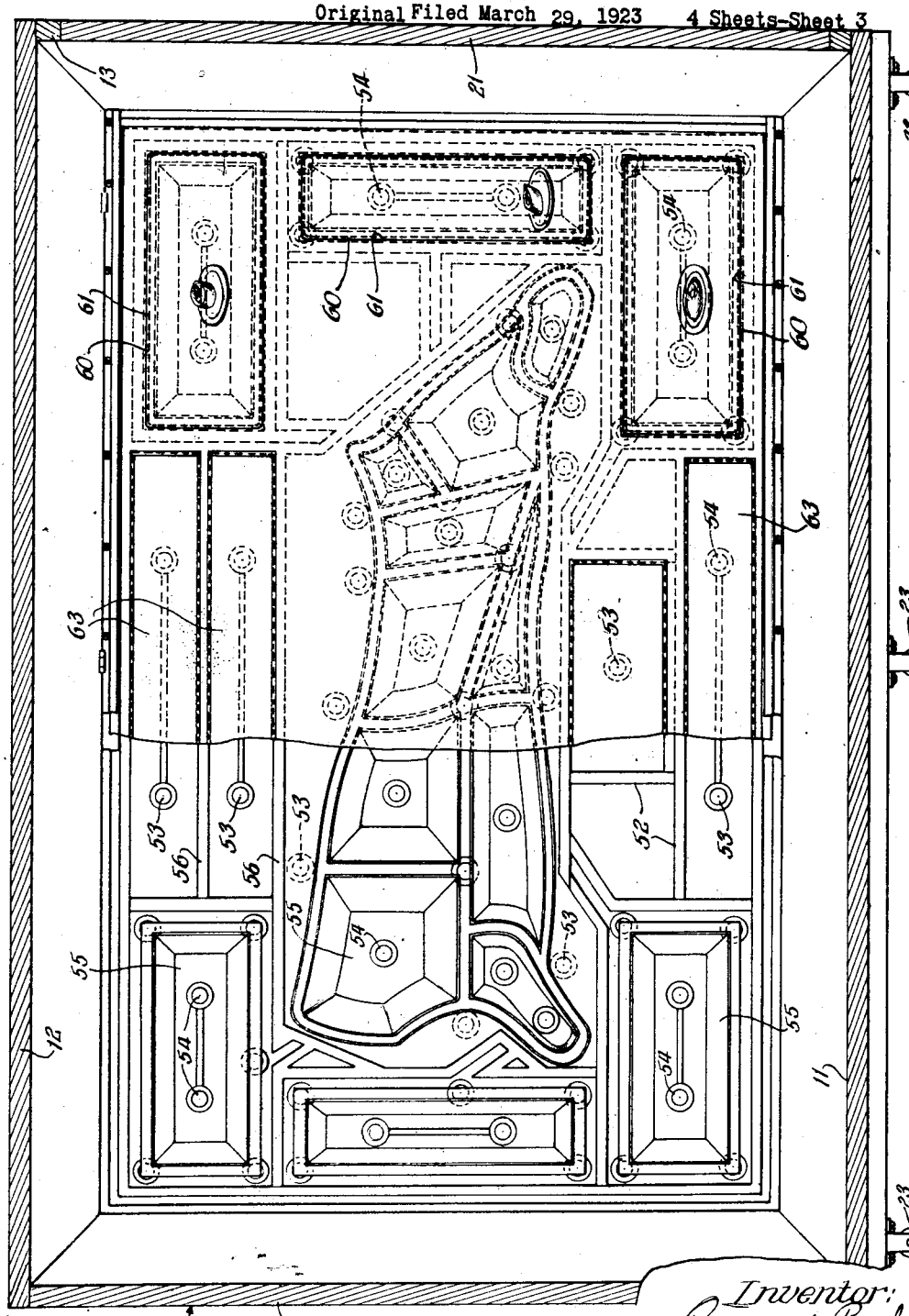

Dec. 13, 1927.
R. PAUL
1,652,636
DISPLAY DEVICE
Original Filed March 29, 1923    4 Sheets-Sheet 4
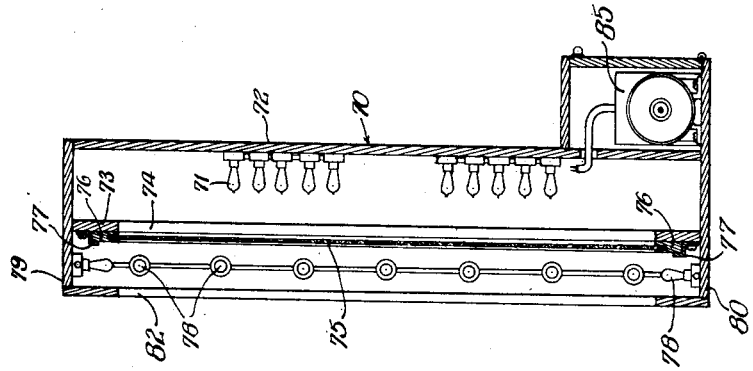
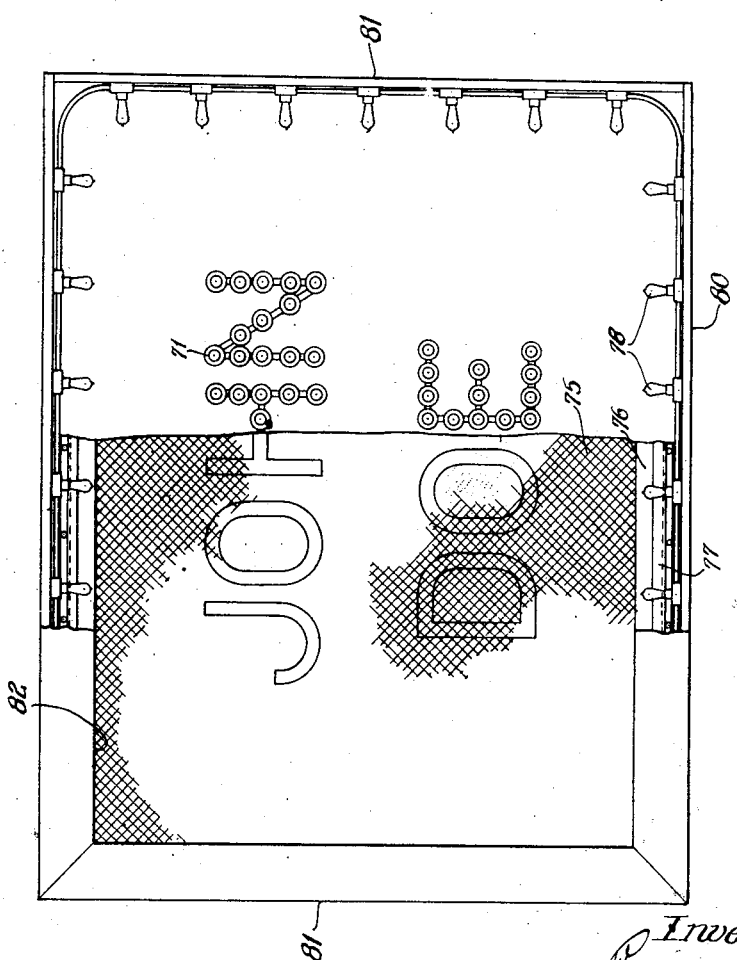
Inventor:
Raymond Paul
By: Wm O Bell
Atty.

Patented Dec. 13, 1927.

1,652,636

UNITED STATES PATENT OFFICE.

RAYMOND PAUL, OF CHICAGO, ILLINOIS, ASSIGNOR OF ONE-HALF TO JOHN E. KOEHLER, OF CHICAGO, ILLINOIS.

DISPLAY DEVICE.

Application filed March 29, 1923, Serial No. 628,427. Renewed November 2, 1927.

The primary object of the invention is to provide a display device of simple construction which can be employed for advertising and for educational purposes, and for disseminating information and directions.

Another object of the invention is to provide a device of this character having a plurality of displays arranged in series, one in front of the other, and adapted to be selectively displayed.

With these and other objects in view, the invention contemplates the provision of front and back displays with illuminating means disposed so that the front display is visible when the illuminating means is inactive, but becomes invisible when the illuminating means is active, and so that the back display becomes visible through the front display when the illuminating means is active. The invention also contemplates the provision of illuminating means to make visible either the front or back display, the back display becoming visible through the front display when it is illuminated; and it also contemplates the provision of more than two displays in a series, any one of which may become visible through those in front of it.

Other objects of my invention will become apparent as the following description progresses, reference being had to the accompanying drawings, wherein Fig. 1 is a perspective view of a display device embodying the novel features of my invention, certain parts thereof being broken away to illustrate the construction of the device.

Fig. 2 is a section taken on line 2—2 of Fig. 1.

Fig. 3 is a section taken on line 3—3 of Fig. 2, certain parts being broken away to show certain details of construction.

Fig. 4 is a front elevation of another form of my improved display device, and

Fig. 5 is a section taken on line 5—5 of Fig. 4.

Similar characters of reference designate similar parts throughout the several views.

Referring for the present to Figs. 1 and 2, the reference character 10 designates a cabinet within which the operative parts of my improved display device are disposed. The cabinet 10 comprises a bottom wall 11, a top wall 12, side walls 13, a back wall 14 and a front wall 15, which has an aperture 16 through which certain hereinafter described displays may become visible. The back wall 14 is provided with a door 17 secured to the back wall 14 by hinges 18, the door 17 permitting access to a chamber 19 formed between the back wall 14 and a partition or support 20 parallel to the front wall 15. Access may also be had to that portion of the interior of the cabinet in front of the partition 20 by means of a door 21 in one of the side walls 13, the door 21 being secured to the side wall by hinges 22—22. The cabinet 10 is supported on a plurality of rollers 23 so that the device may be easily moved from place to place.

As shown in Figs. 1 and 2, a plurality of partitions 25, 26 and 26ª are interposed between the front wall 15 and the partition 20, each of the partitions 25 and 26 having an aperture 27 substantially the same size and shape as the aperture 16 in the front wall 15. A frame 28 disposed in the aperture 27 of the partition 25 is secured to the partition 25 by means of hinges 29—29, and a frame 30 disposed in the aperture 27 of the partition 26 is secured to the partition 26 by means of hinges 31—31. A plurality of screen members 32 and 33 are detachably secured to the frames 25 and 26 respectively by means of a plurality of bent strips 34, one of the strips 34 being rigidly secured to each of the upper and lower edges of the frames 28 and 30, by screws 35. The bent strips 34 together with the frames 28 and 30 form guideways into which screen members 32 and 33 may be inserted in or withdrawn from its associated frame, access may be had to the screen member through the aforementioned doorway in one of the side walls 13.

The partition 26ª is also apertured as at 37 and is adapted to receive a frame 38 of substantially the same size and shape as the frames 28 and 30. The frame 38 is provided with a translucent member 39 which is detachably secured to the frame 38 in the same manner as the screen members 32 and 33 are detachably secured to the frames 28 and 30 respectively. For this purpose the frame 38 has one of a plurality of bent strips 40 at each of its top and bottom edges, the strips 40 being secured to the frame 38 by screws 41. The frame 38 is secured to the partition 37 by hinges 42. It will be noted that the translucent member 39 and each of the screen members 32 and 33 have their edges stiffened by metallic strips 43 which prevent collapsing of the several members 32, 33 and 39.

Rigidly secured to the top wall 12, side walls 13 and bottom wall 11, and disposed between the front wall 15 and the partition 25 are a plurality of lamp sockets 45. A conduit 46 provides means whereby electric conductors may connect the lamp sockets with any suitable source of electric energy. A similarly arranged plurality of lamp sockets 47 are disposed between the partitions 25 and 26 and are provided with a conduit 48 for connecting them with the source of electric energy. The lamp sockets 45 and 47 are provided with lamps 49 and 50 respectively.

Disposed between the translucent member 39 and the partition 20, and rigidly secured to or with respect to the partition 20 are a plurality of lamp sockets 51 and 52 having lamps 53 and 54, respectively. As shown in Figs. 2 and 3, each of the lamp sockets 52 with its associated lamp 54 is disposed in a box 55, having flaring sides and ends. Each of the boxes 55 opens against the translucent member 39 and the lamp or lamps 54 associated with the box may illuminate that portion of the translucent member 39 bounded by the sides and ends of the box. The portions of the translucent member 39 which cannot be illuminated by means of any of the lamps 54 may be illuminated by the lamps 53. This construction permits illumination of the entire translucent member 39 when desired and illumination of any particular portion or portions thereof, when so desired. To permit selective illumination of desired portions of that part of the translucent member 39 which may not be illuminated by the lamps 54, a plurality of partitions 56 are rigidly secured to the partition 20 and have their forwardly extending edges adjacent the translucent member 39.

The lamps 49, 50, 53 and 54 are preferably controlled by an automatic device enclosed in a housing 57, disposed within the chamber 19. The automatic device for controlling the lamps is of the type commonly employed for controlling the lamps of illuminated signs wherein various combinations of the lamps are active at one time and inactive at another time. As my invention is not concerned with the details of construction of the means for controlling the lamps 49, 50, 53 and 54, I will not detail nor describe it, the means being well known to those skilled in the art.

As best shown in Fig. 3, the boxes 55 and partitions 56 divide up the translucent member 39 into a plurality of portions which may be selectively illuminated, by means of the lamps 53 and 54, which are suitably controlled in the manner described.

I have learned that if any pictures, symbols or the like be painted upon each of the screen members 32 and 33 and other pictures or symbols placed upon the translucent member 39 in a suitable manner, the lamps 49, 50, 53 and 54 may be so controlled that the picture, symbol or the like upon the screen 32 may be displayed without displaying the picture, symbol or the like associated with the screen member 33 or the translucent member 39; that the picture, symbol or the like upon the screen member 33 may be displayed through the screen member 32 without attendant display of the picture, symbol or the like on the screen member 32; and that the picture, symbol or the like associated with the translucent member 39 may be displayed through the screen members 32 and 33 without attendant display of the picture, symbol or the like associated with the screen members 32 and 33.

In order to obtain the above results I have found it desirable to have the screen member 33 of a finer mesh than the screen member 32. Thus I have learned that by having the screen member 33 of 40 mesh and the screen member 32 of 30 mesh, the picture or the like painted upon the screen member 32 will not interfere with the display of the picture or the like painted upon the screen 33.

The translucent member 39 preferably comprises a sheet of linen, cotton or the like and its functions are to diffuse the light radiated from the lamps 53 and 54, to carry a plurality of transparencies 60, and to provide a surface upon which any desired pictures, symbols or the like may be painted.

The transparencies 60 are preferably made of negative films which are secured to the sheet of linen, cotton or the like by sewing them to the sheet as indicated at 61, and which are preferably colored to facilitate display thereof.

In the operation of the device, when the lamps 49 are active, the remaining lamps of the device being inactive, the pictures, symbols or the like painted upon the screen 32 are displayed. And the pictures, symbols or the like painted upon the screen 33 may be displayed by having the lamps 50 active, the lamps 49, 53 and 54 remaining inactive. Also, all of the pictures, symbols or the like associated with the translucent member 39, or selections thereof, may be displayed by having all or certain of the lamps 53 and 54 active, the lamps 49 and 50 being inactive.

It will be readily understood that a series of displays relating to a single subject may be placed upon the translucent member 39, and the screen members 32 and 33. Thus, on the screen member 32 I have an animal, on the screen member 33 the carcass of the animal ready for consumption as indicated at 33′ (Fig. 1), and on the translucent member 39 a diagram of the various cuts which may be obtained from the carcass, together with a plurality of colored negative prints, showing the various cuts prepared for consumption.

The translucent member 39 may also carry instructions relative to the preparation of the cuts, the information being painted, printed or otherwise applied to the portions 63 of the translucent member 39.

I prefer to have the automatic lamp controlling device contained within the housing 57 adapted to first supply electric current to the lamps 49 only, then to the lamps 50 only, and then to the lamps 53 and 54 only, and then to various combinations of the lamps 53 and 54. An observer will then first see the display on the screen member 32, then the display on the screen member 33, then the entire display associated with the translucent member 39, and then a plurality of combinations of portions of the display upon the translucent member 39.

In Figs. 4 and 5 I have illustrated another form which my invention may take. An illuminated sign 70 comprising a plurality of lamps 71 carried by a back member or wall 72 is adapted to form a display when the lamps 71 are active. Disposed in front of the lamps 71 and fixed with respect to the wall 72 is a front member or a wall 73 apertured as at 74 and provided with a screen member 75. The screen member 75 is provided with a frame 76, which is secured to the wall 74 by means of bent strips 77. A plurality of lamps 78 disposed in front of the screen member 75 and substantially aligned with its edges are secured to the top and bottom walls, 79 and 80 respectively, and to side walls 81 of an enclosure adapted to receive the screen member 75 and the lamps 78. The front side of the enclosure is apertured as at 82 so that the screen member 75 is visible to an observer standing in front of the sign.

The screen member 75 has painted thereon any desired display which may or may not be a duplication of the display formed by the lamps 71. In the daytime the display on the screen member 75 will be visible at all times, and it will also be visible at night whenever the lamps 78 are active and the lamps 71 inactive. When the lamps 71 are active and the lamps 78 inactive, the display formed by the lamps 71 will be visible through the screen member 75.

I provide the usual means as indicated at 85 for automatically controlling the electric current supplied to the lamps 71 and 78 to obtain the proper operation of the lamps.

I am aware that changes in the form, construction and arrangements of parts may be made without departing from the spirit and without sacrificing the advantages of the invention and I reserve the right to make all such changes as fairly fall within the scope of the following claims.

I claim:

1. In a device of the class described, a cabinet having a display opening in the front thereof, a plurality of screens of different mesh disposed within the cabinet one in front of the other and each having a display thereon, and means disposed within the cabinet about each screen for illuminating the screens independently of each other.

2. In a device of the class described, a cabinet having a display opening in the front thereof, a plurality of screens of different mesh disposed within the cabinet one in front of the other and each having a display thereon, a translucent member behind the screens and having a display thereon, means for illuminating the screens independently of each other, and means for illuminating the translucent member independently of the screens.

3. In a device of the class described, a cabinet having a display opening in the front thereof, a plurality of screens of different mesh disposed within the cabinet one in front of the other and each having a display thereon, a translucent member behind the screens and having a plurality of displays thereon of different sizes and shapes, means disposed within the cabinet about each screen for illuminating the screens independently of each other, and means disposed behind said translucent member and shaped to conform with the displays thereon for illuminating said displays independently of the screens.

RAYMOND PAUL.